United States Patent Office 3,146,216
Patented Aug. 25, 1964

3,146,216
POLYMERIZABLE POLYESTER RESIN CONTAINING A CADMIUM SALT AS POLYMERIZATION INHIBITOR
Alvaro Salgado, Union, and Wolfgang C. Forster, Elizabeth, N.J., assignors to Reichhold Chemicals, Inc., Detroit, Mich.
No Drawing. Filed July 21, 1959, Ser. No. 828,442
9 Claims. (Cl. 260—45.4)

This invention relates to improved stable compositions of matter of unsaturated polyesters, i.e., alkyds, and polymerizable monomers containing >C=$CH_2$ groups, i.e., having terminal ethylenic unsaturation, said compositions, after being catalyzed, having valuable gelling and curing characteristics and yielding copolymers of excellent heat stability.

Compositions of matter containing unsaturated polymerizable monomers and unsaturated alkyd resins of dihydric alcohols and unsaturated dicarboxylic acids, which compositions, referred to as "unsaturated polyester resins" in the following specification, have been known as valuable materials capable of catalytically polymerizing to insoluble and infusible copolymers. In order to obtain materials having an acceptable shelf life, they have to be inhibited with stabilizers. Well-known stabilizers of the phenolic or quinoid type include hydroquinone, quinone, tertiary butyl catechol, etc. Other suitable stabilizers include quaternary ammonium salts, esters of phosphorous acid, copper salts, gaseous oxygen, etc.

However, all these known stabilizers show serious disadvantages, including undue prolongation of the gel time and excessive discoloration, especially at elevated temperatures. On the other hand, the ever increasing application of unsaturated polyester resins in almost every sector of industry has created a need for stable resins which give relatively fast gels at room temperature after being catalyzed. Another requirement is that the polymers obtained therefrom retain their original, almost water-white colors when exposed to elevated temperatures. Still another very desirable property, in many cases, is the B-stageability which is generally defined as a state of undercure between the gel point and full cure. During this time the undercured copolymers can be shaped by punching or by subjecting them to both heat and pressure. Heretofore, it has been impossible to obtain B-stageable unsaturated polyester resins with the technically most important room-temperature catalyst system of both methyl ethyl ketone peroxide and cobalt salts. Instead, high-temperature catalysts, such as tertiary butyl perbenzoate had to be used when B-stageability was desired.

For the purpose of illustrating the importance of B-stageability of room temperature curing resins, the method of making buttons from unsaturated polyester resins is briefly outlined as follows: The first step in making buttons includes the casting of a sheet of suitable thickness. When the resin has gelled, preferably at room or only slightly elevated temperatures in order to protect sensitive pigments which may have been admixed to the resin, the sheet is removed from the mold and button blanks are punched. The punching operation requires a sheet being in an undercured, semi-elastic, namely "B"-stage, because a fully-cured material would be too brittle. The button blanks are then subjected to mild heat until they are fully cured, whereupon they can be machined to obtain the finished button. As a button is frequently exposed to ironing, a good resistance to discoloration at elevated temperature is essential. This is particularly important for white, colorless, and artificial "mother-of-pearl" buttons, where any color degradation is objectionable. Other fields where resistance to color degradation is paramount include the application of polyester resins in making laminates, panels and surface coatings.

One object of the invention is to impart storage stability to those polymerizable compositions.

A second object is to provide B-stageable polymerizable compositions having low peak exotherms.

A third object is to provide polymerizable compositions which yield copolymers resistant to color degradation at both low and high temperature.

These and other objects of the invention will be apparent from the following specification and the claims appended thereto.

It has been discovered that these objects can be attained by adding a minor amount of a cadmium salt of an organic acid, wherein the organic acid is selected from at least one member of the group consisting of monocarboxylic acids, polycarboxylic acids and aryl sulfonic acids, to either ethylenically unsaturated polyesters of dihydric alcohols and unsaturated dicarboxylic acids or to unsaturated polymerizable monomers containing one or more >C=$CH_2$ groups, or to both of them, and thereafter blending said unsaturated polyesters with said unsaturated monomers.

Among the suitable cadmium salts of monocarboxylic acids that may be used are: cadmium linoleate, cadmium undecylenate, cadmium 2-ethyl hexoate, cadmium naphthenate, cadmium stearate, cadmium oleate, cadmium valeriate, cadmium salicylate, cadmium ricinoleate, cadmium para-tertiary butyl benzoate, etc. Cadmium salts of polycarboxylic acids include the cadmium salt of dimerized soybean fatty acid, cadmium tetra propenyl succinate, cadmium citrate, etc. Cadmium salts of aryl sulfonic acids include cadmium paratoluene sulfonate, the cadmium salts of naphthalene sulfonic acid, etc. Although all these cadmium salts have been found suitable for the present invention, the cadmium salts of 2-ethylhexoic acid and of naphthenic acid give particularly good results. The cadmium salt may be formed in situ by adding cadmium oxide or cadmium carbonate to the highly acidic hot polyester alkyd in the beginning, during, or at the end of the esterification, with or without the aid of an azeotropic organic solvent. Although it is preferred in most cases to use a resin-soluble cadmium salt, it has been found that even salts which are only slightly soluble are very effective.

The amount of cadmium that is added in the form of its salts to the resin composition includes about up to 1 to 2% by weight as cadmium based on the weight of the resin composition, while a lower limit of about 0.001% of cadmium is generally required as a threshold amount. It is generally preferred, however, in order to obtain optimum results, to add the cadmium salts in amounts corresponding to between about 0.01% and about 0.3% metal.

The function of the cadmium salt in the present invention is believed to be the stabilization of the non-catalyzed unsaturated polyester resins against premature, radical-initiated polymerization, and the further protection of the polymer made thereof with the aid of peroxide-catalyst systems, against discoloration at normal and high temperatures.

It has been found that the functions of the cadmium in the unsaturated polyester resins and the results obtained therewith, are totally different from the role of cadmium salts of fat acids used sometimes in conjunction with certain halogen-containing thermoplastic materials, such as polyvinyl chloride resins. In the latter case, the cadmium salts prevent discoloration by scavenging traces of hydrochloric acid which are released from such halogenated polymers.

The unsaturated polyester resins to be stabilized with the cadmium salts of the present invention are conventional materials described in the prior art. They are usually made by esterifying, at elevated temperatures, dihydric alcohols and alpha-beta ethylenically unsaturated dicarboxylic acids until an acid number of about between 5 and 80, and preferably, between 20 and 50 is reached, whereupon the resultant alkyd is blended with a stabilizer and a polymerizable monomer having at least one $>C=CH_2$ group. The weight ratio of the alkyd to the monomer may be varied between 95:5 and 5:95. In order to facilitate handling of the resins, such as in casting and molding operations, it is generally preferred to use such a ratio in which a syrupy resin blend results. Depending upon the kind of monomer and upon the behavior of the alkyd, the preferred weight ratio is generally between about 55 alkyd to 45 monomer and about 85 alkyd to 15 monomer.

The said dihydric alcohols considered as starting materials or as reactants for this reaction include saturated and unsaturated aliphatic glycols, such as ethylene glycol, propylene glycol-1,2, propylene glycol-1,3, butylene glycol-1,2, butylene glycol-1,4, pentane diol-1,5, the hexylene glycols, neopentyl glycol, 2-butene-1,4 diol, 2-methyl-3-butyn-2-ol, 3-methyl-1-pentyn-3-ol, etc. They also include dihydroxy polyethers, such as diethylene glycol, dipropylene glycol, triethylene glycol and also the higher polyglycols of waxy consistency, which latter are called commercially "Carbowaxes."

Also, cyclo-aliphatic diols, such as 1,1-isopropylidene dicyclohexanol (hydrogenated bisphenol) are utilized. The ethylenically unsaturated alpha beta dicarboxylic acids considered as starting materials include maleic acid, fumaric acid, aconitic acid, itaconic acid, mono chloromaleic acid, etc., and the corresponding anhydrides of the cis-acids. These ethylenically unsaturated dicarboxylic acids may be partially replaced with either saturated carboxylic acids or those dicarboxylic acids which contain only benzenoid unsaturation. This group includes adipic acid, azelaic acid, sebacic acid, dimerized fat acids, phthalic acid, tetrahydrophthalic acid, hexahydrophthalic acid, etc., as well as the anhydrides of those acids which are capable of forming it. Up to ten mols of these dicarboxylic acid having no ethylenic unsaturation may be used per each mol of ethylenically unsaturated dicarboxylic acid. The preferred mol ratio of ethylenically unsaturated dicarboxylic acid to dicarboxylic acid containing no unsaturation other than benzenoid is between about 5:1 and 1:5.

The group of polymerizable monomers includes the vinyl monomers, such as styrene, vinyl toluene, diallyl phthalate, triallyl cyanurate, triallyl citrate, diallyl maleate, diallyl fumarate, the isomers of dichlorostyrene, etc. It further includes methyl methacrylate, ethyl ethacrylate, methyl acrylate, ethyl acrylate, etc.

It is to be understood that the compositions of matter of the present invention may additionally contain one or more of the known stabilizers. It has been found that the cadmium salts prevent the color degradation associated with phenolic and quinoid stabilizers, and thus can upgrade commercially available unsaturated polyester resins.

The following examples are presented to better illustrate and describe the invention rather than limit it to the particular details set forth therein.

EXAMPLES

(A) Preparations

*Resin A.*—To a 500 cc. round-bottom, three-necked flask fitted with agitator, a carbon dioxide sparge tube and descending condenser were charged 148 parts of phthalic anhydride (1.0 mol), 98 parts of maleic anhydride (1.0), 167 parts of 1,2-propylene glycol (2.2 mols), and heated slowly, with agitation under a carbon dioxide atmosphere, driving off reaction water until a top temperature of 210° C. was reached in the course of about eight hours. The reaction product was kept at that temperature, until the acid number had dropped below 45. The yield was 364 parts of alkyd resin.

The resin was allowed to cool to 160° C., whereupon the inhibitor listed in the tables below was admixed to it.

The hot stabilized resin was added slowly with good agitation to 157 parts of styrene in a vessel which was externally cooled so that the temperature of the blend did not exceed 65° C.

The yield was 521 parts of a syrupy resin.

*Resin B.*—To a flask as described in the preceding example were charged 222 parts of phthalic anhydride (1.5 mols), 98 parts of maleic anhydride (1.0 mol), 209 parts of 1,2 propylene glycol (2.75 mols), and a resin was made according to the procedure described in the preceding example and the yield was 417 parts.

The alkyd made therefrom was mixed with the inhibitor listed in Tables I and II and blended with 254 parts of styrene in a ratio of 65 parts of alkyd per 35 parts of styrene. A viscous, almost water-white resin resulted.

*Resin C.*—To a one-liter, round-bottom, three-necked flask, fitted with stirrer, carbon dioxide sparge tube and descending condenser were charged 348 parts of fumaric acid (3.0 mols), 146 parts of adipic acid (1.0 mol), and 590 parts of dipropylene glycol (4.4 mols), and a resin was made in accordance with the procedure described above. The resulting 940 parts of alkyd, having an acid number of 49, were blended with 314 parts of vinyl toluene containing the inhibitor listed in Table V. There were obtained 1254 parts of a viscous resin.

(B) Evaluation (1) A comparison of the storage stabilities of unsaturated polyester resins containing cadmium salts as listed herein below was made against resins containing hydroquinone. The results are listed in Table I.

TABLE I

*Storage Stability (Shelf Life) of Uncatalyzed Resins at 25° C.*

| | Inhibitors | | | |
|---|---|---|---|---|
| | 0.01% Cd | 0.6% Cd | 0.3% Cd | 0.01% hydroquinone |
| | Months | Months | Months | Months |
| Resin A | About 2 | >3 | >3 | >3 |
| Resin B | About 2 | >3 | >3 | >3 |
| Resin C | About 2 | >3 | >3 | >3 |

The cadmium salt used as stabilizer was a concentrated solution of cadmium 2-ethyl hexoate in xylene, corresponding to a metal content of 10% cadmium. The storage stability of the inhibited resins was determined by placing a 100 gram sample into a 4 oz. glass jar which was kept in the dark. The end of this stability period was indicated by the occurrence of gelled particles in the resin.

(2) In order to demonstrate the effect of cadmium salts on the resistance of cured unsaturated polyester resins against color degradation the following test was made, the results listed in Table II, and compared against resins containing known inhibitors.

The polyester resin containing inhibitor according to the table below, was catalyzed with 1.0% of Lupersol DDM (60% methyl ethyl ketone peroxide in dimethyl phthalate) and 0.01% of a solution of cobalt naphthenate containing 6% of metal. "Lupersol" is a trade name of the Lucidol Division of Wallace & Tiernan Inc., 1740 Military Road, Buffalo 5, New York.

The catalyzed resin was poured between two glass plates separated by a ⅛ inch Teflon gasket and cured for one hour at 70° C. Thus, there was obtained a ⅛ inch sheet from which squares 1.5 by 1.5 inches were cut with a saw. "Teflon" is a trademark of E. I. du Pont de Nemours & Co., Inc., Wilmington 98, Delaware, for tetrafluoroethylene resins. These are available—see The Condensed Chemical Dictionary, Reinhold, Fifth Edition.

The color of these untreated squares (color at slightly elevated temperature) was compared with the same after they had been placed for five minutes in a convection oven at 180° C.

Resin B was used for all these tests. The cadmium salt used was a concentrated solution of cadmium 2-ethylhexoate in xylene, corresponding to a metal content of 15%.

TABLE II

*Resistance of Copolymers of Unsaturated Polyester Resins Against Color Degradation*

| Inhibitor systems | Color after exposure to one hour at 70° C. | Color after exposure to 5 minutes at 180° C. |
|---|---|---|
| 0.01% hydroquinone | Very slight yellowing. | Yellowish brown discoloration. |
| 0.01% tertiary butyl catechol | do | Do. |
| 0.01% trimethyl benzyl ammonium chloride. | No yellowing | Brown discoloration. |
| 0.001% Cd | do | Practically no yellowing. |
| 0.01% Cd | do | Do. |
| 0.1% Cd | do | Do. |
| 0.5% Cd | do | Do. |
| 0.01% hydroquinone + 0.01% Cd. | do | Do. |
| 0.01% tertiary butyl catechol + 0.3% Cd. | do | Do. |

It is apparent from these tests that cadmium salts not only impart a good color per se, but that they also can suppress the yellowing encountered with phenolic inhibitors.

(3) To determine the curing characteristics of cadmium-containing resins at room temperature, 100 grams of Resin A containing inhibitor according to the table below were mixed at 25° C. with 1.0 gram of Lupersol DDM and 0.01 gram of cobalt naphthenate containing 6% metal. The cadmium salt used was a solution of cadmium naphthenate in white spirits, corresponding to a metal content of 8%. The catalyzed resin was placed in a 4 oz. glass jar, and a thermocouple connected to a Speedomax-Recorder was inserted, the tip of the thermo-coupled being in the center of the resin.

The gel time was measured from the point of adding the catalyst system until the resin gelled; the cure time was measured from the time of gelation until the thermocouple indicated the so-called peak exotherm, i.e., the highest temperature.

TABLE III

*Curing Characteristics at Room Temperature*

| Inhibitor | Gel time at 25° C. (in minutes) | Cure time (in minutes) | Peak exotherm, ° F. |
|---|---|---|---|
| 0.01% hydroquinone | 300 | | |
| 0.01% tertiary butyl catechol | 300 | | |
| None | 8¾ | 27 | 308 |
| 0.001% Cd | 10 | 33 | |
| 0.01% Cd | 10 | 44 | 272 |
| 0.10% Cd | 20–22 | 90 | 125 |
| 0.30% Cd | 18 | 65 | 130 |
| 1.0% Cd | 7¾ | 56 | 172 |

The results of Table III show that cadmium salts in a resin impart a short gel time combined with a long cure time and low peak exotherm.

(4) B-stageability of cadmium-containing resins was compared with resin containing known inhibitors, and the results are listed in Table IV. The following method was employed:

A 100 g. sample of resin catalyzed with 1.0 g. of a 60% methyl ethyl ketone peroxide and 0.01 gram of cobalt naphthenate containing 6% metal was poured between two glass plates which were separated by a ⅛ inch Teflon gasket, and held together by clamps.

The resin was allowed to gel, and thereafter allowed to stand overnight. Then the resin sheets were removed from the plates and tested for B-stageability by trying to punch blanks from the sheet with a cork borer. An easy punching operation causing no cracks or tears in the resin sheet was indicative of the B-stage.

All resins containing cadmium showed this behavior, while those containing phenolic or quaternary ammonium salt inhibitors were fully cured to such a stage that they were no longer punchable. Any attempt to punch by force led to cracking of the cured sheet.

The resins containing cadmium remained B-stageable for over two days.

TABLE IV

*Stages of Cure*

| Inhibitor | Stage of cure after 15 hours at 25° C. | Stage of cure after 60 hours at 25° C. |
|---|---|---|
| 0.01% hydroquinone | Fully cured | Fully cured. |
| none | do | Do. |
| 0.1% trimethyl benzyl ammonium chloride. | do | Do. |
| 0.01% Cd | B-stage | B-stage. |
| 0.1% Cd | do | Do. |
| 1.0% Cd | do | Do. |

Similar tests were conducted employing 1% of cumene hydroperoxide in conjunction with cadmium. The resin was gelled at 60° C., kept at that temperature for one hour, and then the resin sheet removed from the mold. The sheet was easily punchable and remained in the B-stage for more than half a year. It was of excellent color and showed good heat stability.

(5) Curing characteristics at elevated temperatures of cadmium-containing resins were compared with those of resins containing a known inhibitor and none, respectively, and the results were listed in Table V.

The "SPI" test was conducted, consisting of placing a test tube 12 mm. in diameter, 150 mm. in length, which was filled 3 inches high with resin catalyzed with 1.0% benzoyl peroxide, into a 180° F. water bath, and measuring the temperature within the resin with an inserted thermocouple connected to a Speedomax-Recorder. According to the "SPI" specification, the time (in minutes), the temperature of the resin requires to rise from 150° F. to 190° F., is called the SPI gel time. Likewise, the time from 190° F. until the peak exotherm is reached represents the SPI cure time.

The following tests were conducted with Resin C. The cadmium salt used was a solution of cadmium naphthenate, corresponding to a metal content of 12%.

TABLE V

*Curing Characteristics at Elevated Temperature*

| Inhibitor | Time from 150° F.–190° F. | Time from 190° F. to P.E. | Peak exotherm, ° F. |
|---|---|---|---|
| None | 1 min. 40 sec | 1 min. 11 sec | 423 |
| 0.01% Cd | 1 min. 39 sec | 1 min. 17 sec | 411 |
| 0.10% Cd | 1 min. 28 sec | 1 minute | 413 |
| 1.0% Cd | 1 min. 42 sec | 1 min. 11 sec | 395 |
| 2.0% Cd | 2 min. 9 sec | 1 min. 47 sec | 376 |
| 0.01% hydroquinone | 3 min. 27 sec | 1 min. 13 sec | 404 |

The data from Table V show that the B-stageability of resins containing cadmium salts can be eliminated whenever undesirable by using benzoyl peroxide and slightly elevated temperature.

We claim:
1. A resin composition comprising (A) a polymerizable blend of (*a*) an unsaturated polyester of (1) a dihydric alcohol and (2) an ethylenically unsaturated dicarboxylic acid and (*b*) a polymerizable monomer containing terminal ethylenic unsaturation, (B) and a minor amount of a cadmium salt of an organic acid as an inhibitor in the proportion of about 0.01% to 2% by weight of the resin measured in terms of the amount of cadmium present in the salt, wherein said organic acid is selected from at least one member of the group consisting of monocarboxylic acids, polycarboxylic acids, and aryl sulfonic acids.

2. A composition of matter of claim 1, wherein the (a) unsaturated polyester additionally contains (3) a dicarboxylic acid free of ethylenic unsaturation.

3. A resin composition comprising (A) a polymerizable blend of (a) an unsaturated liner polyester of (1) an aliphatic dihydric alcohol, (2) an ethylenically alpha-beta unsaturated dicarboxylic acid and (b) a polymerizable vinyl monomer, (B) a minor amount of cadmium salt of a monocarboxylic acid in the proportion of about 00.1% to 2% by weight of the resin measured in terms of the amount of cadmium present in the salt, said salt being soluble in the blend.

4. A resin composition comprising (A) a polymerizable blend of (a) a linear unsaturated polyester of (1) propylene glycol-1,2, (2) maleic acid, (3) phthalic acid, and (b) styrene, (B) a minor amount of cadmium 2-ethyl hexoate in the proportion of about 0.01% to 2% by weight of the resin measured in terms of the amount of cadmium present in the salt.

5. A method of stabiling a polymerizable blend of (a) an unsaturated polyester of (1) a dihydric alcohol, (2) an ethylenically unsaturated dicarboxylic acid, and (b) a miscible polymerizable monomer containing terminal ethylenic unsaturation, which comprises incorporating a minor stabilizing amount of a cadmium salt of mono-carboxylic acid as an inhibitor in the proportion of about 0.01% to 2% by weight of the resin measured in terms of the amount of cadmium present in the salt.

6. A method of claim 5, wherein the (a) unsaturated polyester further contains (3) a dicarboxylic acid free of ethylenic unsaturation.

7. A method of stabilizing a polymerizable blend of (a) an unsaturated linear polyester resin of (1) an aliphatic dihydric alcohol, (2) an ethylenically alpha-beta unsaturated dicarboxylic acid, and (b) a miscible polymerizable vinyl monomer, which comprises incorporating a minor stabilizing amount of cadmium 2-ethyl hexoate in the proportion of about 0.01% to 2% by weight of the resin measured in terms of the amount of cadmium present in the salt.

8. A method of claim 5, wherein said (1) dihydric alcohol is propylene glycol-1,2, the (2) ethylenically unsaturated dicarboxylic acid is maleic acid, the (3) dicarboxylic acid free of ethylenic unsaturation is phthalic acid, the (b) polymerizable monomer is styrene, and wherein the cadmium salt of a mono-carboxylic acid is cadmium naphthenate.

9. A resin composition comprising (A) a polymerizable blend of (a) an unsaturated polyester of (1) a dihydric alcohol and (2) an ethylenically unsaturated dicarboxylic acid and (b) a polymerizable monomer having at least one $>C=CH_2$ group, (B) and a minor amount of a cadmium salt of an organic acid as an inhibitor in the proportion of about 0.01% to 2% by weight of the resin measured in terms of the amount of cadminum present in the salt, wherein said organic acid is selected from a member of the group consisting of monocarboxylic acids, polycarboxylic acids, and aryl sulfonic acids.

References Cited in the file of this patent

UNITED STATES PATENTS

| | | |
|---|---|---|
| 2,642,410 | Hoppens | June 16, 1953 |
| 2,921,873 | Rogers | Jan. 19, 1960 |

FOREIGN PATENTS

| | | |
|---|---|---|
| 630,158 | Great Britain | Oct. 6, 1949 |
| 1,060,590 | Germany | July 2, 1959 |